US005826164A

United States Patent [19]

Weinblatt

[11] Patent Number: 5,826,164

[45] Date of Patent: *Oct. 20, 1998

[54] TECHNIQUE FOR SURVEYING A RADIO OR A TELEVISION AUDIENCE

[76] Inventor: Lee S. Weinblatt, 797 Winthrop Rd., Teaneck, N.J. 07666

[ * ] Notice: The term of this patent shall not extend beyond the expiration date of Pat. No. 5,630,203.

[21] Appl. No.: 548,591

[22] Filed: Oct. 26, 1995

Related U.S. Application Data

[63] Continuation of Ser. No. 3,325, Jan. 12, 1993, Pat. No. 5,630,203.

[51] Int. Cl.[6] .................................................... H04B 17/00

[52] U.S. Cl. .................................... 455/2; 455/6.3; 348/1

[58] Field of Search ............................... 455/2, 6.3, 67.2; 348/1, 2, 3, 4; 368/47

[56] References Cited

U.S. PATENT DOCUMENTS

| | | | |
|---|---|---|---|
| 3,906,450 | 9/1975 | Prado, Jr. . | |
| 4,025,851 | 5/1977 | Haselwood et al. | 455/2 |
| 4,230,990 | 10/1980 | Lert, Jr. et al. | 348/4 |
| 4,258,386 | 3/1981 | Cheung | 455/2 |
| 4,599,644 | 7/1986 | Fisher | 348/4 |
| 4,613,904 | 9/1986 | Lurie | 358/142 |
| 4,718,106 | 1/1988 | Weinblatt | 455/2 |
| 4,845,755 | 7/1989 | Busch et al. | 381/68 |
| 4,931,871 | 6/1990 | Kramer | 358/142 |
| 4,945,412 | 7/1990 | Kramer | 358/142 |
| 5,023,929 | 6/1991 | Call | 455/2 |
| 5,168,372 | 12/1992 | Sweetser | 358/349 |
| 5,382,970 | 1/1995 | Kiefl | 348/1 |

FOREIGN PATENT DOCUMENTS

| | | |
|---|---|---|
| A-0 135 192 | 3/1985 | European Pat. Off. . |
| A-0 172 095 | 2/1986 | European Pat. Off. . |
| A-2 196 167 | 4/1988 | United Kingdom . |

*Primary Examiner*—Edward F. Urban

*Attorney, Agent, or Firm*—Frishauf, Holtz, Goodman, Langer & Chick, P.C.

[57] ABSTRACT

A surveying technique transmits a combined signal made up of a programming signal and a surveying signal, both of which are in the audible range. The surveying signal is uniquely coded to identify a signal source such as a radio station or television channel. At the receiver, the surveying signal is separated from the programming signal and then modified so as to be reproduced outside the audible range for detection by a portable unit worn by a person being monitored for his listening and/or viewing habits. The detection of the inaudible survey signal by the portable unit identifies the signal source to which the person was tuned.

2 Claims, 2 Drawing Sheets

TECHNIQUE FOR SURVEYING A RADIO OR A TELEVISION AUDIENCE

This application is a continuation of U.S. patent application Ser. No. 08/003,325, filed on Jan. 12, 1993, now U.S. Pat. No. 5,630,203.

BACKGROUND OF THE INVENTION

This invention is directed to a surveying technique for determining whether a monitored individual is tuned to a given signal source such as a television channel or radio station and, in particular, to the transmission of a survey signal combined with a programming signal which are both in the audible frequency range, but which converts and reproduces the survey signal to an inaudible signal that is used to detect the signal source to which the individual is tuned.

It is important for a number of reasons to survey an audience to determine to what extent each of its members is tuned at any given time to a particular source of programming such as a television channel or radio station (collectively referred to as a "signal source"). Advertisers are, of course, interested in is determining the number of people exposed to their broadcast commercials and to characterize their listeners by economic and social categories. Broadcasters find the statistics regarding audience size and type beneficial in setting their advertising rates.

Prior art techniques for obtaining such information involve primarily the following approaches. People within the range of the radio station or who receive a television channel (either over the air or by cable) are contacted by phone and interviewed regarding their listening habits. Each person is questioned about the signal sources which that individual listened to during the previous, say, twenty-four hours. However, this technique is suspect because it is subject to recall errors as well as possible bias introduced by the interviewer. If a specific signal source is mentioned to the person being interviewed, the suggestion may elicit a positive response even when tuning to that particular signal source actually did not occur. Another technique involves keeping diaries by persons agreeing to act as test subjects. Diary entries are to be made throughout the day to keep track of what signal sources are being listened to. The diaries are collected periodically and analyzed. However, this approach is prone to inaccuracies because the test subjects may fail to make entries due to forgetfulness or laziness. Thus, it can be readily seen that the recall-dependent approach first described above is unsatisfactory because people may not accurately remember what they listened to at any particular time and, also, because of the potential problem of suggestive bias. The diary-based approach is likewise unsatisfactory because people may not cooperate and be as meticulous in making diary entries as required to obtain the desired record-keeping accuracy.

It is also known to utilize a survey signal transmitted in combination with a programming signal for producing survey signals in the audible range. As disclosed in U.S. Pat. No. 4,718,106, the periodically transmitted survey signal is detected and reproduced by a speaker in the form of a code. The code is detected by a device worn by the individual being monitored, and data on the incidence of occurrence and/or the time of occurrence are stored and analyzed.

The tendency to reproduce the transmitted survey signal human audibly is a drawback of this technique because it can tend to disturb the listener. In order to provide meaningful results, an interval of preferably no more than ten minutes should elapse between survey signals. However, this can cause a chopping of, for example, a musical program at an inappropriate point, and some people can become annoyed just by virtue of this code being repeatedly reproduced audibly. Consequently, it is preferable to avoid use of a human audible survey signal. However, government regulations in some countries may require that signals for commercial radios, for example, must be limited to human audible range. In fact, even though speakers which are now available can reproduce frequencies beyond the audible range of a human being, nevertheless the usable transmission frequencies permitted by government regulations are limited to such audible range because of the need for compatibility with older, lower quality speakers. Thus, there exists a conflict between the respective requirements at the transmission end and the receiving end. At the transmission end, there is the need to transmit a survey signal in the human audible frequency range, while at the receiving end it is preferable to reproduce the survey signal outside the human audible range.

Along with monitoring the signal source to which an individual is tuned, it is also useful to determine the length of time during which the individual remained tuned to such signal source. In U.S. Pat. No. 4,718,106 it is contemplated that, for example, the time of day is stored each time a coded survey signal is detected. If the signal is reproduced, say, every ten minutes, then each hour six time signals will need to be stored in memory. Since the memory must be capable of storing data collected over a reasonably long period of time, such as one month, it is readily apparent that a high capacity memory device would be required.

SUMMARY OF THE INVENTION

One object of the present invention is to provide an improved audience survey technique utilizing a transmitted survey signal which is used to identify the signal source to which a monitored individual is tuned.

It is another object of the present invention to transmit a survey signal in the human audible range but to reproduce it as a non-human signal.

A further object of the present invention is to minimize the amount of data which must be stored to provide the required survey information.

These and other objects are attained in accordance with one aspect of the present invention which is directed to an apparatus for surveying an audience to determine whether a person is tuned to a given signal source, such as a radio station or a television channel, transmitting a programming signal along with a survey signal characteristic of such signal source, with such programming signal and survey signal being in a frequency range to be human audibly reproduced by a receiver unit. The apparatus includes transmission means for combining the programming signal and the survey signal for transmission thereof as a combined signal. A receiving means is responsive to the combined signal for separating the survey signal from the programming signal. A conversion means converts the separated survey signal to an output signal, and the output signal is reproduced outside of the human audible frequency range. The reproduced output signal is detected as being indicative of the transmitting signal source.

Another aspect of the present invention is directed to an apparatus for surveying an audience to determine whether a person is tuned to a given signal source, such as a radio station or a television channel, repeatedly transmitting a survey signal characteristic of such signal source. The apparatus includes means to detect the occurrence of a received survey signal and to store a first time signal in response thereto. Another means is provided to inhibit storing a time signal in response to repeated receptions of the survey signal following the first time signal. A stop signal is generated upon the survey signal being no longer received. A second time signal is stored in response to the stop signal. The first and second time signals are indicative of the duration of a time interval during which the person was tuned to the signal source transmitting the survey signal.

DETAILED DESCRIPTION OF THE DRAWINGS

Figure 1:
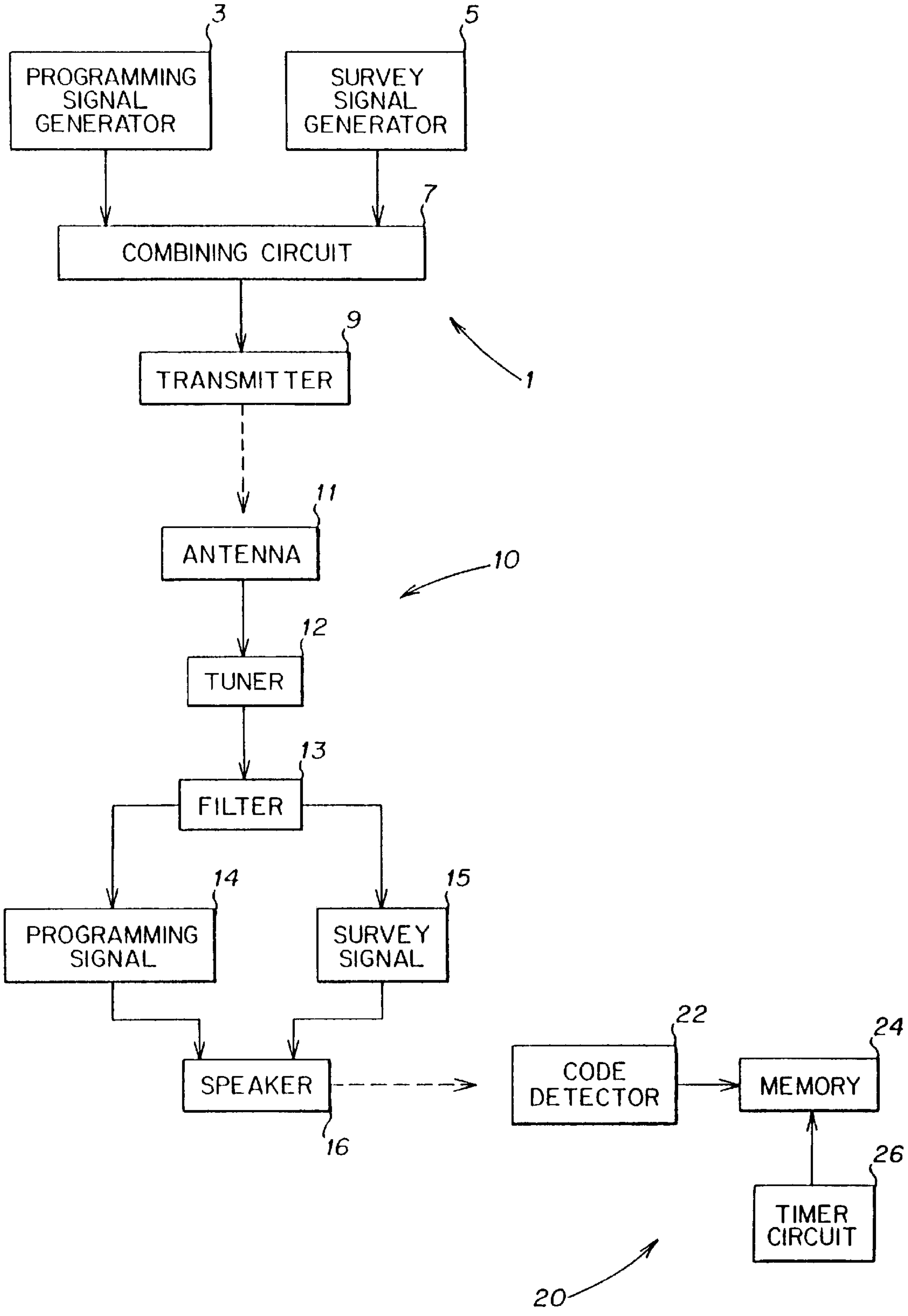
FIG. 1 is a block diagram of a circuit in accordance with the invention.

To conduct the survey, persons are selected by the surveying organization based on certain criteria. These criteria can be, for example, age, income, geographic location, sex, and level of education. The broadcasting organization and/or advertisers may require an analysis of their listeners which is broken down into one or more of these categories. The individuals who are approached to be test subjects are merely asked to participate in a test the details of which are not explained. Each person is told only that a requirement of the test is the wearing of a certain article of clothing. Additional information is preferably not supplied in order to avoid predisposing or prejudicing the individual test subject toward or away from the aims of the survey. For example, if the individual were told that the survey relates to a radio survey, then this might result in more time and attention being paid to radio listening than would be normal for that person. Even worse would be the situation were the individual told the particular radio station involved in the survey. In order to avoid this problem, each individual is given an article of clothing to wear on a regular basis. For example, such an article of clothing might be a watch for men or a bracelet for women.

The drawing depicts in block form a signal source 1 for emitting frequency signals at one of the frequencies to which radios are tunable on either the AM or FM band or on which television channels transmit. In both cases, the frequencies used are in the range for producing signals normally to be converted at the receiving end into human audible sounds. Signal source 1 includes a programming signal generator 3, and a survey signal generator 5. Generator 3 can be a microphone for a live performance or a tape of some pre-recorded program. Generator 5 is likely to be a taped coded signal, and it can be operated on a timer with a preset interval between playbacks or it can be operated with a switch selectively actuated manually. The outputs of generators 3 and 5 are added in combining circuit 7, and then provided to transmitter 9. Details of all such elements 3, 5, 7 and 9 are well known in the art. Accordingly, it is not deemed necessary to provide the circuit and structural specifics of this transmitting means nor any other such details connected with a signal source, except as follows.

Generator 5 produces a coded survey signal utilized for a purpose to be described below in greater detail. Suffice it to say at this point that generator 5 produces a modulating signal transmitted on the carrier airwave emitted by transmitter 9 so as to be detectable by a receiver which is tuned to the frequency of the particular signal source of interest. The coded survey signal is emitted at preselected time intervals, as discussed below in further detail. Its most significant feature lies in its code being unique to that particular signal source. Its transmission, reception and subsequent playback by a speaker characterize the receiver as being tuned to that particular signal source.

Transmitter 9 broadcasts its signal over the airwaves in a standard fashion. These signals are picked up by a conventional receiver 10 having antenna 11, tuner 12, signal processing means 14, and speaker 16. If the tuner 12 is tuned to the signal source of interest, then the signals broadcast by transmitter 9 will be reproduced by the speaker 16.

Up to this point, the description of receiver 10 has involved only well known units in widespread use in a receiver. To implement the objects of the invention, further circuitry is required. It will now be described as part of receiver 10 and also as circuitry provided in miniaturized form housed in a compact enclosure of some type capable of being readily worn by an individual, as mentioned above. This compact circuit configuration is referred to below as the portable signal detector unit 20.

Turning first to receiver 10, filter 13 serves to separate the survey signal from the received programming signal. Filter 13 can be, for example, a notch filter which removes a narrow band of frequencies such as have no discernible impact on the quality of the received and reproduced programming signal. The filtered survey signal is processed by circuit 15 and then inputted to speaker 16. Circuit 15 changes the frequency of the survey signal from the human audible frequency range in which it was transmitted to another frequency which is outside of the human audible frequency but which can, nevertheless, be reproduced acoustically by the speaker 16. Circuit 15 can increase the frequency or drop the frequency so that it is above or below, respectively, the frequency range which is audible to human beings. Thus, the key to proper operation of circuit 15 is to provide receiver 10 with the capability of acoustically reproducing the survey signal, but to do so outside of the human audible frequency range.

A portable signal detector 20 is shown in FIG. 1 as including a code detector 22. Code detector 22 includes a device for responding to the signal emitted by speaker 16 as well as circuitry for processing the detected signal. More specifically, if speaker 16 generates an acoustic signal (as opposed to another type of signal discussed below), then code detector 22 includes a sensor device which responds to it and converts it to an electrical signal. That electrical signal is a code indicative of the coded survey signal, and it is compared by the circuitry in code detector 22 against a preselected code. If the codes match, then code detector 22 provides an output signal to memory 24 which stores it as an indication that an incidence of the individual being tuned to the given signal source has been detected. Optionally, the output of a time circuit 26 can also be stored in the memory together with this incidence signal so that not only the incidence is recorded, but also the time when it occurred. The subject matter of U.S. Pat. No. 4,718,106 is hereby incorporated by reference in connection with the circuitry and operation of code detector 22, memory 24 and time circuit 26 (identified in such patent as detection circuit 11, memory 13 and time circuit 15).

It is contemplated that the output of circuit 15 could be inputted to a reproducing device other than a sound source such as speaker 16. Instead, a source of infrared light could be used, for example. In such a case, code detector 22 includes a suitable device for responding to the receipt of such infrared light and, in response thereto, to produce an electrical signal for processing by the electrical circuit in code detector 22, as explained above. The remainder of the operation of code detector 22, memory 24 and time circuit 26 can be as described above.

Portable signal detector unit 20 can be accommodated in any small article of clothing which a person normally wears. For example, a male test subject might be given a wristwatch into which the various components 22, 24 and 26 have been installed. Time circuit 26 is, of course, an inherent part of the watch. Many electronic watches have been developed which include a memory. Alarm-type watches include a tone producing transducer. This transducer can be replaced with a microphone to detect rather than generate acoustic signals. The remaining circuitry is implementable on a small scale and can readily be inserted into the conventional watch. For a female, the circuitry for portable signal detector unit 20 can be inserted in a bracelet, a decorative pin, or a necklace pendant.

The information stored in memory 24 can be retrieved in one of several ways. For example, the portable signal detector unit 20 can be collected at, say, monthly intervals. The contents of memory 24 are then dumped into another suitable memory from where it can be organized and analyzed as needed.

Information obtained in the above-described manner will indicate to what extent the test subjects were tuned to the particular radio station of interest. Only a passive wearing of the article is required. If unit 20 picks up signals from receiver 10, this means that the test subject is close to the receiver and is likely to be listening to the radio or watching television. No deliberate action whatsoever on the part of any test subject is required in order to record the event. Moreover, no skewing of the test results can occur due to any suggestions because these individuals need not be informed about the purpose of the test. They are merely given the article of clothing and are asked to wear it. No more needs to be said. Consequently, the test is completely accurate in terms of fully recording one's radio listening and/or television watching habits, and the test is conducted under natural, real-life conditions.

This technique can also provide valuable information about the type of person listening in. It lends itself to careful selection of the test subjects in terms of, for example, income, education, family size, etc. Information available about such test subject can be combined with the stored tuning habits information so that the resulting data can be analyzed together and refined into various categories of listeners.

If the time of day is recorded when a stored signal is generated, an analysis can be made for the benefit of the advertiser. That time can be correlated against the time when a given commercial was broadcast. Statistics can, therefore, be provided regarding the size of the audience to which the commercial was exposed. Such time information is also valuable to the broadcasters because it reveals the popularity of the shows put on the air by that station. This information can be used to set advertising rates as well as to rearrange the programming as necessary.

As has been mentioned above, memory 24 is likely to require a device of high storage capacity if data must be input and stored each time a survey signal is detected. In accordance with one aspect of the present invention, time information can be stored while minimizing the amount of storage capacity of memory 24 which is required. How this is accomplished is explained below in connection with FIG. 2.

The problem with a prior approach for storing time information is the necessity to store time information at each incidence of a detected survey signal. However, the present invention stores only a Start Time and an End Time. The Start Time is stored when the individual initially tunes to the given signal source. The End Time is stored when an interruption is detected in receiving the survey signal. Consequently, all intervening time signals are no longer needed.

Figure 2:
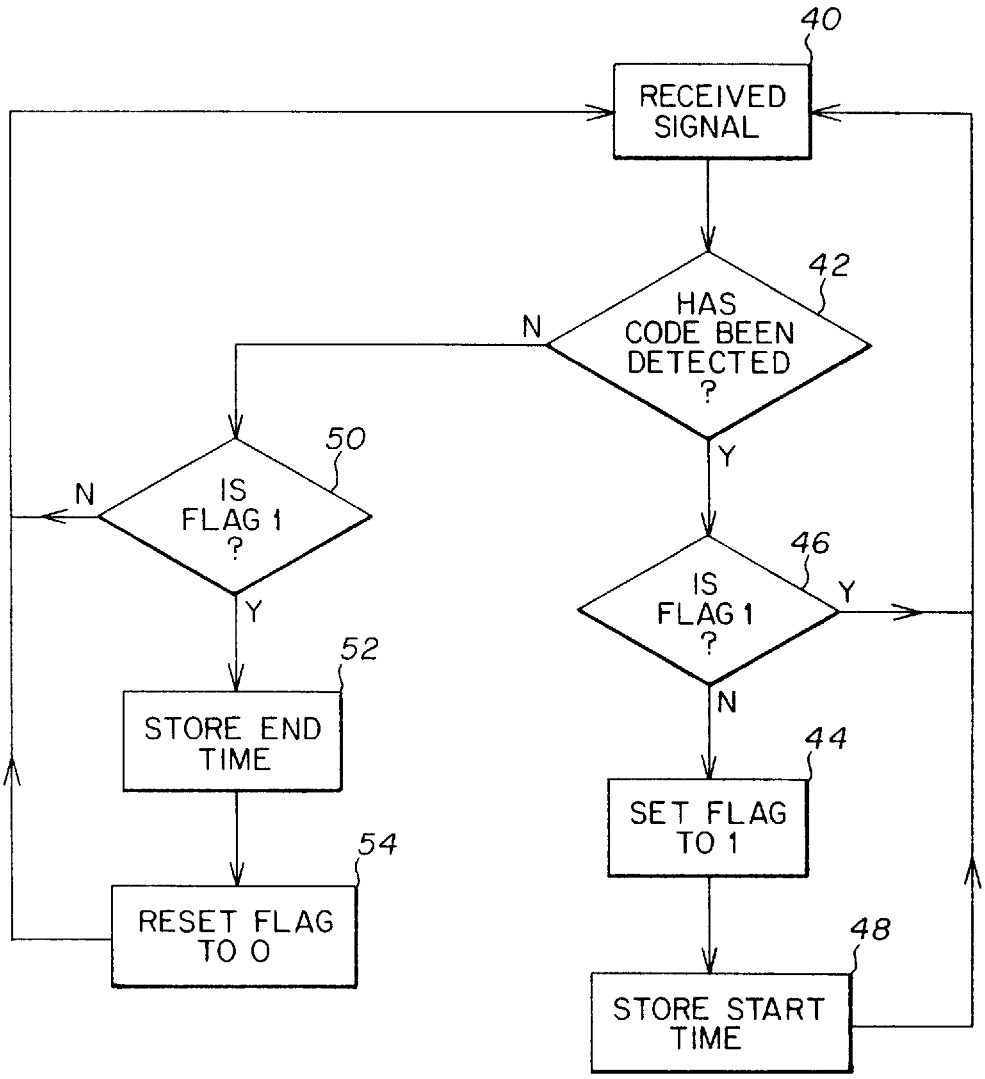
FIG. 2 is a flow chart of steps used in storing time information into an electronic memory.

More specifically, the survey signal is detected by code detector 22 as a coded signal in accordance with step 40 of FIG. 2. Step 42 determines whether the received signal includes a code which matches the preselected code. If such a match is detected, then the flow proceeds to step 44 (skipping step 46 for the present time) where a flag is set to 1. Step 48 stores into memory 24 the time then recorded by the watch, and designates it as the Start Time. The flow then loops back to step 40. If the presence of the code is still detected by step 42, then step 46 determines that the flag has already been set to 1. Consequently, rather than directing the flow to step 48 where an additional time would otherwise have been stored in memory 24, step 46 directs the flow back to step 40 to restart the loop. Consequently, no additional data on this loop is stored into memory 24. In fact, the loop of steps 40, 42 and 46 will be continued with no additional data being stored into memory 24 until the monitored individual tunes away from the given signal source.

When the individual tunes away from the given signal source, step 42 will direct the flow to step 50. If step 50 determines that flag 1 is set, this means that up until that point the individual had been tuned to the given signal source. The fact that the survey signal code is no longer being detected indicates that the individual has just tuned away from the given signal source. Consequently, step 50 directs the flow to step 52 which results in the storage in memory 24 of the time then recorded by the watch, and designates it as the End Time. Step 54 then resets the flag to zero and returns the flow to step 40.

As long as the preselected code is not detected by step 42, the flow of steps will loop through steps 40, 42 and 50.

As can readily be appreciated from the above, the necessity for storage space in memory 24 is sharply reduced with the use of the present invention because only the Start Time and End Time need to be stored and the intervening time information is unnecessary. As data is stored in memory 24, the Start Time is distinguished from the End Time by the use of an extra bit. Thus, for example, the most significant bit ("MSB") for Start Time data can be assigned to be a "0", while for the End Time data it can be assigned to a "1". When the stored information is analyzed, the MSB is retrieved so that the data associated therewith can be identified as Start Time or End Time data in order to enable appropriate analysis of the stored data.

It should be apparent that although a preferred embodiment of the invention has been described above, various modifications can readily be made thereto. All such modification are intended to be included within the scope of the invention as defined by the following claims.

I claim:

1. An apparatus for surveying an audience to determine whether a tuning device is tuned to a given signal source which is transmitting a survey signal at preset intervals and is characteristic of said signal source, comprising:

means to detect a first occurrence of the survey signal received by said tuning device and to store a first time signal in response to said first occurrence;

means to inhibit storing a time signal in response to receptions of said survey signal following said first time signal;

means to generate a stop signal upon stoppage of said survey signal being received; and means to store a second time signal in response to said stop signal.

2. The apparatus of claim 1, wherein said first time signal is a start time and said second time signal is an end time indicative of an interval of time during which the receiver unit was tuned to the signal source.

* * * * *